United States Patent [19]
Jakob

[11] Patent Number: 5,839,571
[45] Date of Patent: Nov. 24, 1998

[54] CONVEYOR BELT JOINTING DEVICE AND METHOD FOR MAKING SAME

[75] Inventor: Horst Jakob, Deaux, France

[73] Assignee: ASER, Saint-Chamond, France

[21] Appl. No.: 913,055

[22] PCT Filed: Jan. 10, 1997

[86] PCT No.: PCT/FR97/00047

§ 371 Date: Sep. 5, 1997

§ 102(e) Date: Sep. 5, 1997

[87] PCT Pub. No.: WO97/26466

PCT Pub. Date: Jul. 24, 1997

[30]  Foreign Application Priority Data

Jan. 17, 1996 [FR] France .................................. 96 00465

[51] Int. Cl.$^6$ ................................................. B65G 17/00
[52] U.S. Cl. ........................................... 198/844.2; 24/35
[58] Field of Search ........................ 198/844.2; 24/31 B, 24/35; 474/255, 257

[56]  References Cited

U.S. PATENT DOCUMENTS 5,573,470  11/1996  Jakob ................................ 198/844.2 X

FOREIGN PATENT DOCUMENTS

2116609  7/1972  France .
2532409  2/1977  Germany .
9511393  4/1995  WIPO .

*Primary Examiner*—James R. Bidwell
*Attorney, Agent, or Firm*—Browdy and Neimark

[57]  ABSTRACT

A conveyor belt jointing device with a generally H-shaped cross-section comprising a central portion (1) forming the crossbar of the H, and two pairs of flanges (2, 2'; 3, 3') connected to respective sides of the central portion (1) and integral therewith. The jointing device comprises two separate reinforcing elements (4, 4'). The reinforcing elements consist of stacked plies of cables made of metal or a synthetic material and having little or no inherent stretchability, the ply cables being arranged at angles of around 45° to the longitudinal direction and around 90° to the cables in the ply located immediately above or below.

13 Claims, 6 Drawing Sheets fig. 1 fig. 2 fig. 3 fig. 4a fig. 4b fig. 4c fig. 5 fig. 6

CONVEYOR BELT JOINTING DEVICE AND METHOD FOR MAKING SAME

BACKGROUND OF THE INVENTION

1. Technical Field of the Invention

The present invention concerns a junction device for conveyor bands or for belts, generally H-shaped, which can transmit very high tensile stresses from one end of the conveyor to the other band on which it is mounted, while bearing without wear or damage, the passage on driving rollers, idle or stretches rollers used for moving the conveyor band, as well as the setting into trough of the conveyor band over its working path. In the following description, the term conveyor band will include the meaning of belt for an easy wording of the description.

2. Prior Art

In the preceding patent applications, the Applicant of the present application has disclosed junction device for conveyor bands, generally H-shaped, comprising a central part, corresponding to the H bar of the profile and two pairs of wings arranged on each side of the said central part, each one presenting a spacing such as the respective end of a conveyor band can be engaged therein, by bringing it approximately in abutment against the central part and to fix it to the said wings. The junction devices proposed were made of a flexible and elastic material in which was embedded a reinforcement, longitudinally extensible (the longitudinal direction being conventionally and for the convenience and clarity of the presentation of the whole of the present description and of the claims the longitudinal direction of the conveyor band, and applied also to the junction device, considered, in the way it has to be mounted on the conveyor band). The transversal direction is the direction perpendicular to the longitudinal direction as defined hereabove, whatever may be the dimensions of the junction device considered separately. This extensibility of the reinforcements of this type of junction devices in the longitudinal direction is aimed to enable the junction devices mounted on the conveyor bands, to step over repeatedly, without excessive wear or stress, entailing a quick alteration, the curved part or the conveyor bands paths, i.e. while these latter are passing round the driving rollers, the idle rollers and the stretching rollers. In fact, during this operation the upper part of the junction devices is submitted to tensile stresses while their lower part (i.e. the one directed towards the external surface of the rollers) is submitted to compression stresses, this resulting from the path difference of these parts, these paths being directly proportional to the curvature radius, which varies owing to the thickness of the junction devices. In the junction devices, object of the preceding applications, the applicant has proposed several means for achieving this extensibility of the reinforcements, woven fabrics with differential stretching of the warp with respect to the weft, knitted fabrics, metallic cables or synthetic resin cables of a high breaking strength and a low extensibility, but arranged according to a sinuous or a zigzag pattern. Since a limit must be fixed for the extensibility, in order to ensure the transmission of the tensile stresses which causes the movement of the conveyor band, this limit is obtained, in the case of fabrics by stretching the threads with a differential stretching of the warp with respect to the weft, in the case of knitted fabrics by stretching the warp threads inserted loose in the knitted fabric during the knitting operation, and in the case of inextensible cables or inherently insufficiently extensible cables, these latter tend to straighten in order to adopt a more rectilinear shape.

The reinforcements proposed previously have proven reliable in numerous applications. However, certain applications require the capacity of transmitting very high tensile stresses, while the extension capacity of the reinforcements must remain unaltered, the conditions of passage over the rollers remaining the same, as well as those related to the setting in trough. For these applications, the solutions previously proposed were not able to comply with this specific problem concerning the transmission of very high tensile stresses. This problem occurs especially in heavy duty installations, fitting for instance mine workings or open quarries, and in particular lignite mines. Even if high resistance inextensible or slightly extensible cables, made of steel, of carbon or glass fibers, grafted polyamide (or similar) set according to sinuous or zigzag patterns, a very large number would have to be arranged, tightened one against the other, thus limiting their ability to straighten freely and leading to the adverse effects of shearing the constituent material.

OBJECT AND SUMMARY OF THE INVENTION

Thus, the object of the present invention is to propose a junction device which is able to lend itself temporarily to the path differences sustained during the passage over the rollers of their upper part and their lower part, while remaining capable of transmitting very important longitudinal tensile stresses. Furthermore, the object of the invention is also to propose junction devices, which are capable of sustaining a curvature resulting from the setting into trough of the conveyor bands on their work path. On the other hand, the object of the invention is to propose methods of manufacturing these junction devices.

The problem thus presented is solved according to the invention by junction devices for conveyor bands, generally H-shaped, made up of a central part or core and of two pairs of approximately parallel wings, in one single piece with the central part to which they are connected to each side of this latter, each one of the pairs of wings being fitted for attachment to one end of the conveyor band inserted in the space provided between the wings of the pair considered and abutting approximately against the central part, two reinforcement elements being embedded in the flexible and elastic constituent material of the junction device, and extending, one of them in the upper wing of a pair of wings, in the central part and in the upper wing of the other pair of wings, the other reinforcement element extending in the lower wing of a pair of wings, in the central part and in the lower wing of the other pair of wings, the constituent material of the junction device sticking to the reinforcement elements, characterised by the fact that each one of the said reinforcement elements is made up by at least two layers of high resistance cables, inherently inextensible or slightly inextensible, arranged in two parallel planes, leaving between them a space or spaces filled with material sticking to the cables of the two layers, the cables of each one of the layers being arranged in a rectilinear pattern mutually parallel and directed according to an acute angle $\alpha$ with respect to the longitudinal direction, the cables of one layer crossing, on the plane view, the cables of the adjacent layer located above or beneath it.

Practically, as it will be seen further on, preferably, use will be made of layers prepared before hand, in which the parallel rectilinear cables are gathered by means of a binding material, the said binding material being either the same constituent material as the one used for the junction devices according to the invention or a different material, since the binding material should be compatible with the constituent material of the junction devices and in particular liable of strongly adhering to this latter. Similarly the binding material must be liable of strongly adhering to the cables. This adherence may be obtained in practice at different stages of manufacture but it must be present in the finished product, as explained further on. In the case where the binding material and the constituent material of the junction device are rubbers which can be vulcanised, the adherence of the binding material of the cables on the one hand, and of the constituent material of the junction device on the other hand is obtained at the final stage of vulcanisation of the whole junction device. It has to be noted that the space which keeps apart the two layers of cables, is filled either with the binding material or with the constituent material of the junction device. In practice, it is easier to have this space filled by the binding material of two adjacent prefabricated layers. Methods for setting cable layers in the manufacturing moulds are explained further on. The capacity of the junction devices according to the invention transmitting high tensile stresses is obtained thanks to the use of cables of very high breaking strength, which can be provided in great number thanks to the arrangement according to the invention. The stress which can be transmitted by the cables $F_{tc}$ is expressed by the relation:

$$F_{tc} = QR_r \cos \alpha$$

where Q is the number of cables, $R_r$ the breaking strength of one single cable, $\alpha$ being the acute angle between the cables of each layer and the longitudinal direction. Obviously a safety coefficient must be introduced. It is understood that the smaller $\alpha$, the higher the transmission capacity of tensile stresses by the cables. However, the other condition to be complied with, vizus, the capacity of the junction device to match with the curvature of the rollers during the passage of these latter and to bind in the other direction in order to follow the curvature of the conveyor band when this latter is set in a trough in its work path, requires a high value for this angle $\alpha$. Calculation and tests have demonstrated that an angle of 45° was a fair compromise; it goes without saying that different angles may also be chosen in accordance with the required applications.

However, the capacity of the cables for transmitting high stresses is not the only quality looked for. It is also necessary that the cables resistance to the peeling of the material to which they adhere should be compatible with the stresses to be transmitted. It is thus necessary that the cables should have a surface of adherence to the surrounding material sufficiently large to avoid the <<peeling>> of the said material. The dimensions of the wings in the longitudinal direction is calculated in such as the resistance of the cables to peeling which increase with the adherence surface, this latter increasing in relation with the length of the cables, thus with the dimension of the wings, should be compatible with the pulling stresses to be transmitted, with a safety coefficient, the pulling stresses which can be transmitted by the cables themselves, must also be, as mentioned hereabove, compatible with the pulling stresses which have to be transmitted, with a safety coefficient.

Furthermore, the reinforcement elements, linked to the material which adheres to the cables of the layers which constitute these elements, must adapt itself to the passage of the rollers, to the extensions and compressions, which in this circumstance, affect the upper part and respectively the lower part of the junction devices. It has also to be underlined that, as an additional complexity to the problem considered, in several applications among those aimed to by the present invention, and especially those related to heavy duty installations of mining and open quarries, the conveyor band is set <<in a trough shape >> along its work path, i.e. that its longitudinal edges are raised to form a <<trough>> for containing the carried materials, while avoiding their fall by the side of the conveyor band. The curvature resulting from this setting <<in a trough shape>> is carried out at right angle to that which occurs during the passage over the rollers. In order to design these junction devices to enable them matching successively with these two curvatures, the angle $\alpha$ will range preferably but not compulsorily, since it merely represents in any case a compromise, about 45°.

The extensions and the shrinkings of the reinforcement elements according to the invention are made possible only thanks to the cooperation of the material which adheres to the cables, this material being flexible and elastic and enabling a variation of the angle $\alpha$, which decreases with tensile stresses and increases with compression stresses. The curvatures to which the junction devices are submitted, either during the passage over the rollers or during the setting in a trough shape of the elements, result in length differences of the parts of the junction device involved, ranging currently between 6 and 12%, and even more as the case may be, these length differences being converted into pulling stresses and compression stresses which tend respectively either to decrease the angle $\alpha$ or to increase it. This is made possible only if the flexible and elastic material which surrounds them and which adheres to the cables, on the one hand does not unbind from the cables by loosing its adherence, and on the other hand is not submitted to a too high strain.

It is well known in the rubber and plastics industries, that materials submitted to an excessive fatigue are quickly damaged, well before the normal aging, and may even break locally, with the irreparable damage of the object to which they belong.

In practice, and for the current applications considered, it is proved that an angle a equal to or close to 45°, and that a space between adjacent layers ranging between the half and the three quarters of the cable diameter are the most able to bear the contradictory curvatures thrusted on the one hand by the passages over the rollers and on the other hand by the setting in a trough shape, by providing a fair balance in what concerns the properties required, while avoiding an excessive thickness in the design of the wings of the junction devices according to the invention. However, obviously, junction devices according to the invention, in which the angle $\alpha$ is different from 45°, and in which the space between the cable layers is different from that mentioned hereabove, may lead to still acceptable results, in relation with the specific requirements of the applications envisaged, while remaining within the scope of the invention: an angle $\alpha$ ranging between 30° and 45° is acceptable, best results being obtained with an angle of 45°.

The link between the wings of the junction devices and the respective ends of the conveyor band may be carried out in various different ways, with a combination of some of them.

A first linking means comprises the vulcanisation of the internal faces of the wings of one pair of wings with the upper and lower faces of the end of the conveyor band involved. This well known method has the advantage of leading to an almost perfect distribution of the pulling stresses and to a good resistance to fatigue on use. If the vulcanised faces area is sufficient, and in view of that it is possible to determine the surface of the wings in relation with the required applications, the adherence provided by the vulcanisation enables to cope without any problem, with the expected pulling stresses. The drawback of the vulcanisation is the length of the duration of the operation and furthermore, it can only be envisaged with rubbers which can be vulcanised.

A second linking means comprises the cold sticking. The method is faster. It may be carried out on various materials, which are not limited to rubbers. However, cold sticking is not as sure as vulcanisation. According to the applications, it is often combined to a third linking method.

This third linking means comprises the riveting, which obviously may be used alone, that being often the case. Each one of the rivets cross successively through one wing, the end of the conveyor band and the other wing of the pair. The rivet heads, i.e. the preshaped head and the head formed at the other end of the rivet, bear upon the internal faces of the wings. Preferably, holes provided with seating cups supporting the heads, are previously formed in the wings during the manufacture of the junction devices according to the invention. As a matter of fact, although it may be envisaged to place rivets in wings without preformed holes, it is highly preferable, in order not to leave to the user's random choice or inspiration the number of rivets used and the geometry of their arrangement, to supply a product compulsorily used in a correct way, i.e. as specified by the junction devices manufacturer.

As a matter of fact, in the case of junction devices according to the invention, designed for transmitting considerable pulling stresses, it is of major importance that the number of rivets and the geometry of their arrangement should not be fixed at random. As a matter of fact, this geometry must be determined out of the fact that conveniently the combing resistance of the rivets involved inside the conveyor band frame has to be taken into account. Knowing the global pulling stress to be transmitted, the number of rivets to be provided is determined first by dividing the global stress to be transmitted by the combing resistance of one rivet inside the conveyor band frame. According to the invention, the rivets are arranged in such a way as a same longitudinal zone including one rivet does not meet another rivet. This leads to divide mentally, the width of the wings into longitudinal bands including one single rivet hole. However, obviously on account of the number of rivets to fix, these latter would be located tightly close the ones with respect to the others, if they were arranged on one same transversal line; since the rivets transmit a pulling stress exerted on the crossed cables, the resistance to peeling of the crossed cables of the actuating zone of each rivet would be insufficient on account of the proximity of the rivets and of the narrowness of the actuating zone. According to the invention, the holes for adjoining rivets are shifted by a sufficient distance in the longitudinal direction, in order that the area of the elastic linking zones which associate the junction device material to the crossed cables of the actuating zone of a rivet should be sufficient, and in that way the resistance to peeling of the cables in each one of the actuating zone is higher than the share of the global pulling stress assigned to one rivet.

BRIEF DESCRIPTION OF THE DRAWINGS

Embodiments of the invention will be described further on, in relation with the drawing in which:

FIGS. 4a, 4b and 4c are schematic plan views representing:

in 4a the cable pattern of two superimposed layers, the junction device being at rest;

in 4b the cable pattern of two layers submitted to pulling stresses in the longitudinal direction;

in 4c the cable pattern of two layers submitted to compression stresses in the longitudinal direction;

DETAILED DESCRIPTION OF THE PREFERRED EMBODIMENT(S) OF THE INVENTION

Figure 1:
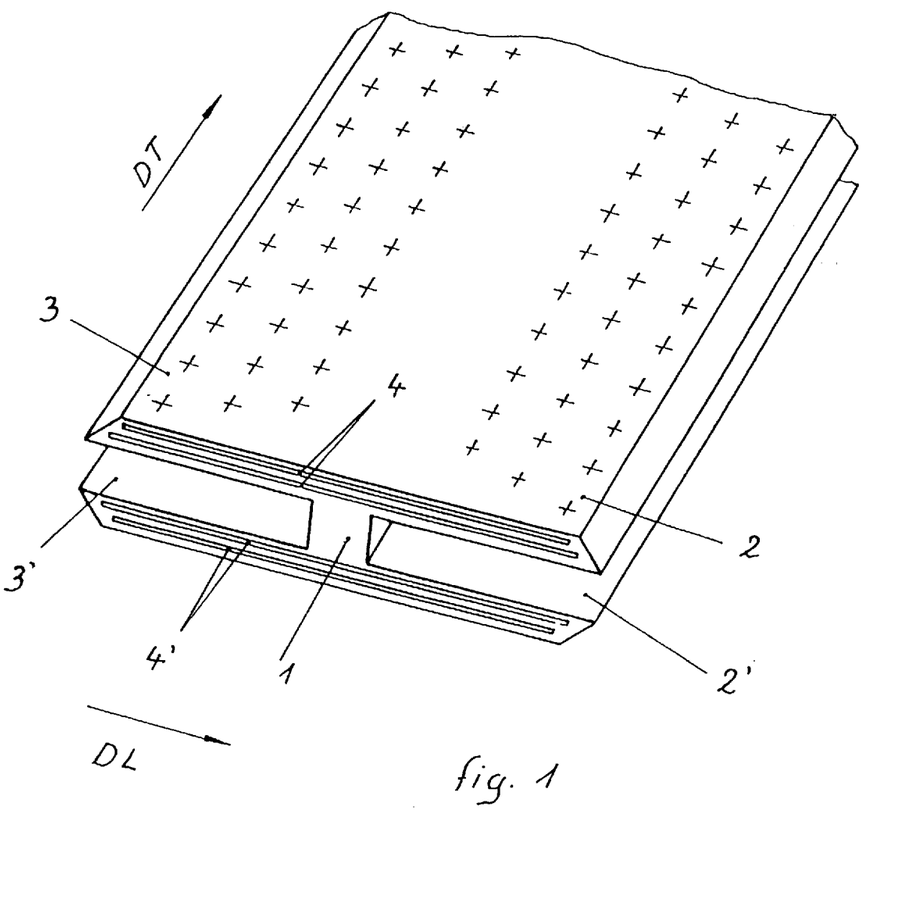
FIG. 1 is a perspective view of a junction device of the type defined generally H-shaped, to which the invention is applied.

FIG. 1 enables the identification of the central part 1, or the core, of the junction device, of the wings 2, 2' and 3, 3', a higher reinforcement element 4 and a lower reinforcement element 4'. This Figure is merely aimed to show the main parts of the junction devices of the type defined, the junction device as represented, lacking the specific characteristics of the invention. FIG. 1 comprises also an arrow DT, representing the transversal direction as defined and an arrow DL, reresenting the longitudinal direction as defined.

Figure 2:
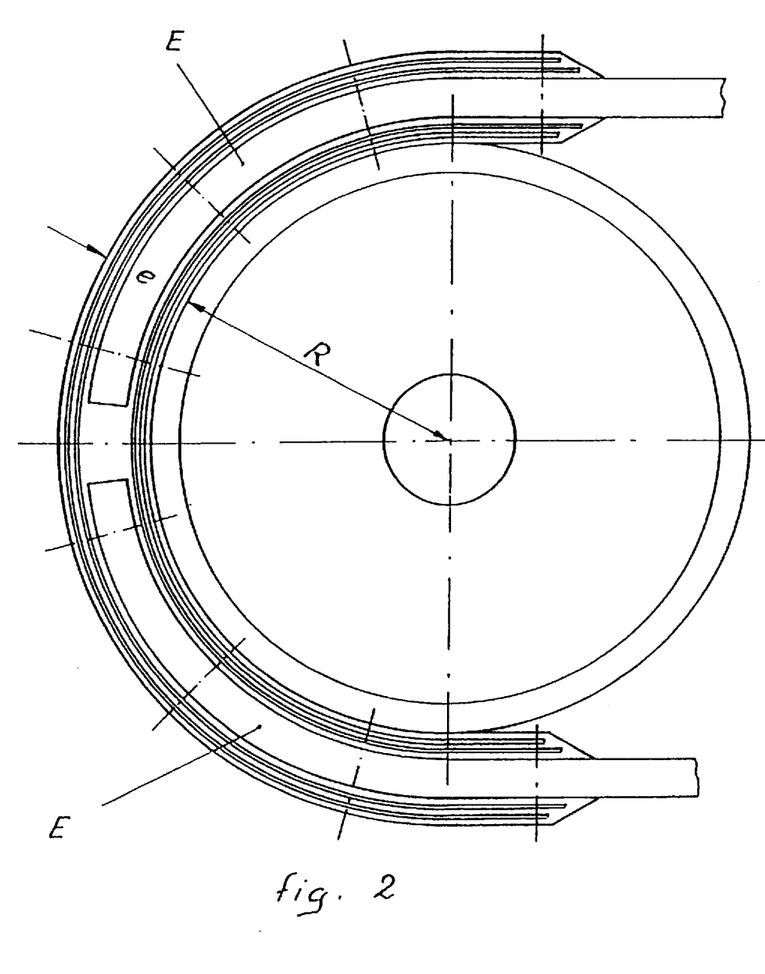
FIG. 2 is a cross section of a junction device and of a conveyor band passing over a driving roller.

FIG. 2 represents the various paths followed by the upper parts of the junction devices and their lower parts over a roller of radius R, e being the thickness of the junction device. The length difference of these paths may reach 6 to 12% and even more, on account of the current dimensions chosen for R and e. The paths are easily computed according to the conventional formula of the circle, $2\pi r$ (r being equal in that case to R), to (R+e) or to intermediate values for the parts of the junction device located at intermediate distances between R and (R+e), $2\pi r$ bearing an angular coefficient depending upon the arc of contact of the conveyor band with the roller considered, this angular factor being most often equal to 180°/360° or ½.

Figure 3:
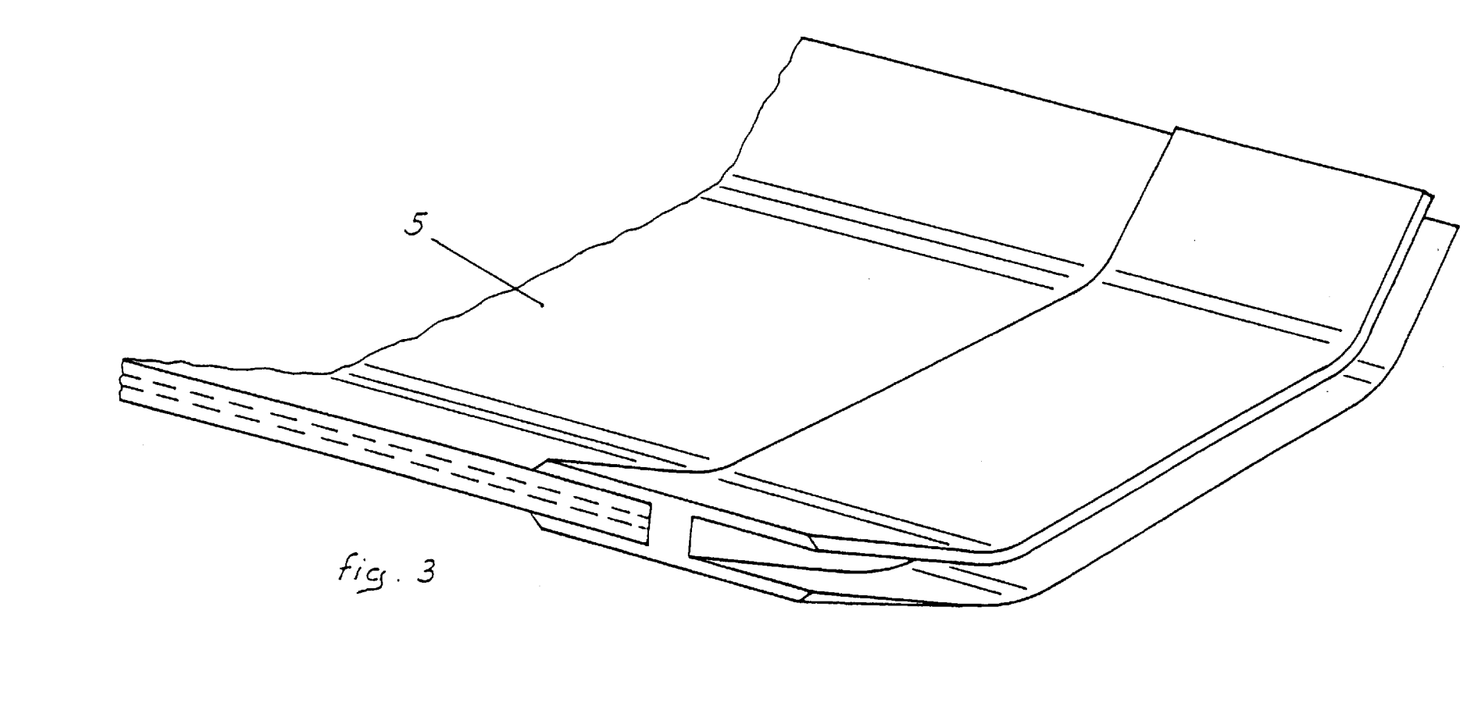
FIG. 3 is a perspective view of a conveyor band and of its junction device, the edges of which are raised on its workpath, i.e. set in a <<trough shape>>.

FIG. 3 shows the perspective of the setting in a trough shape of a conveyor band 5 the edges of which are curved upwardly, resulting in a correlative curvature of the junction device. It will be observed that this curvature is perpendicular to the curvature to which the junction device is submitted when passing over the rollers.

Figure 4A:
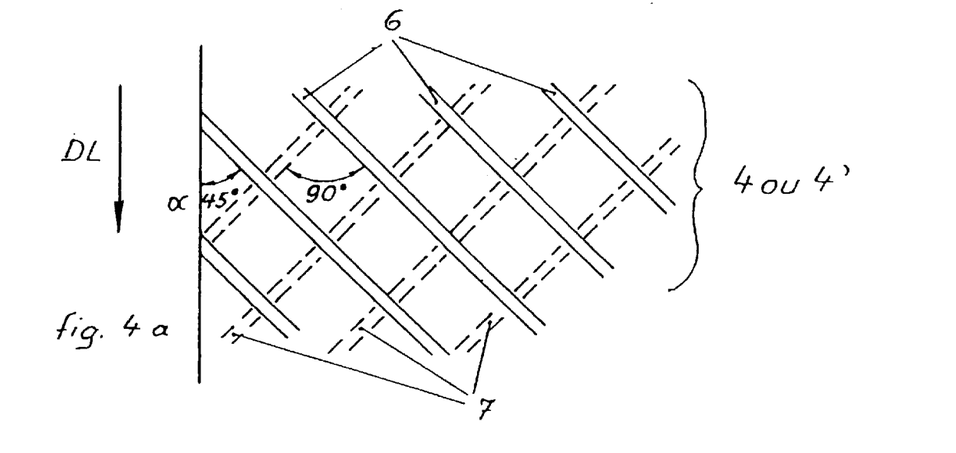

FIG. 4a is a plan view of the cables 6 of an upper layer of a reinforcement element 4 or 4' of the junction device and of the cables 7 of an adjoining lower layer of the same reinforcement element 4 or 4' of a two layer junction device, by way of example, the junction device being at rest. In this preferred embodiment, it will be noticed that the cables of one layer cross the longitudinal direction according to an angle α of 45°, shown practically by the arrow DL, along one edge, and that the cable 6 of a layer cross the cables 7 of the other layer at 90°. In order to visualise the two cable layers, the cables 6 are represented by a wide continuous line and the cables 7 by two thin interrupted lines with a space between them. It has to be noted that for a convenient representation the cables are shown with a space between the cable of one same layer, much longer than the one imposed by the scale referred to the current cables diameter which ranges about 2 mm.

Figure 4B:
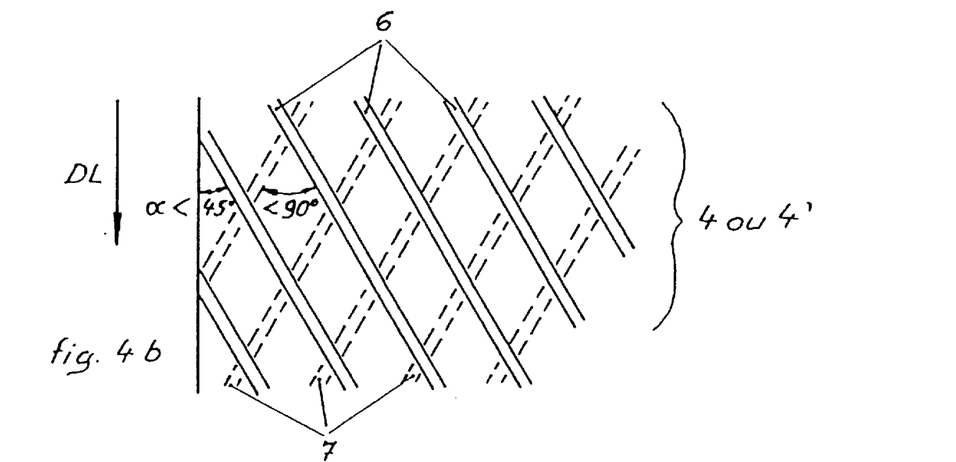

FIG. 4b shows the same reinforcement element submitted to a pulling stress in the longitudinal direction. The squares, initially formed by the cables 6 and 7, in a plane view, are changed to lozenges the longitudinal diagonal of which is of a larger dimension than the transversal one. The material located around the cables of the two layers, which adheres to these latter, works in extension, compression and torsion.

Figure 4C:
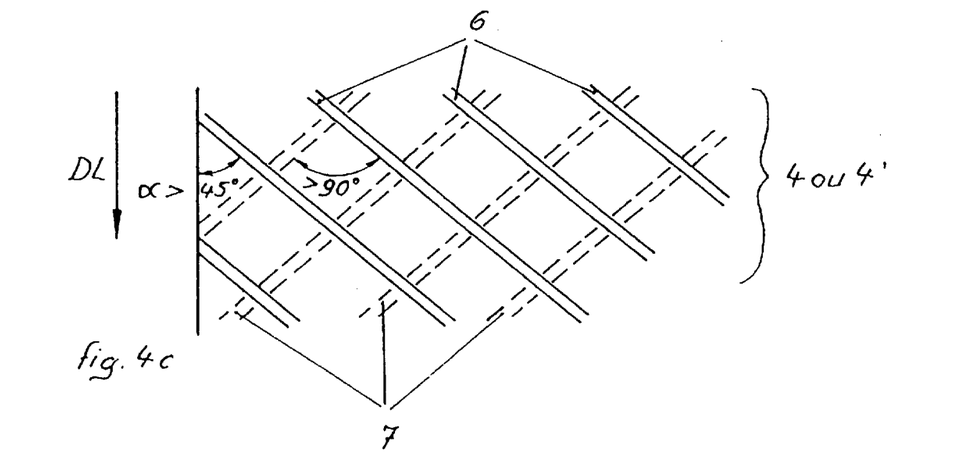

FIG. 4c shows the same reinforcement element submitted to a compression stress in the longitudinal direction. Lozenges are also formed but the dimensions of their diagonals varies in opposite directions with respect to those corresponding to the diagonals of the lozenges of FIG. 4b.

Figure 5:
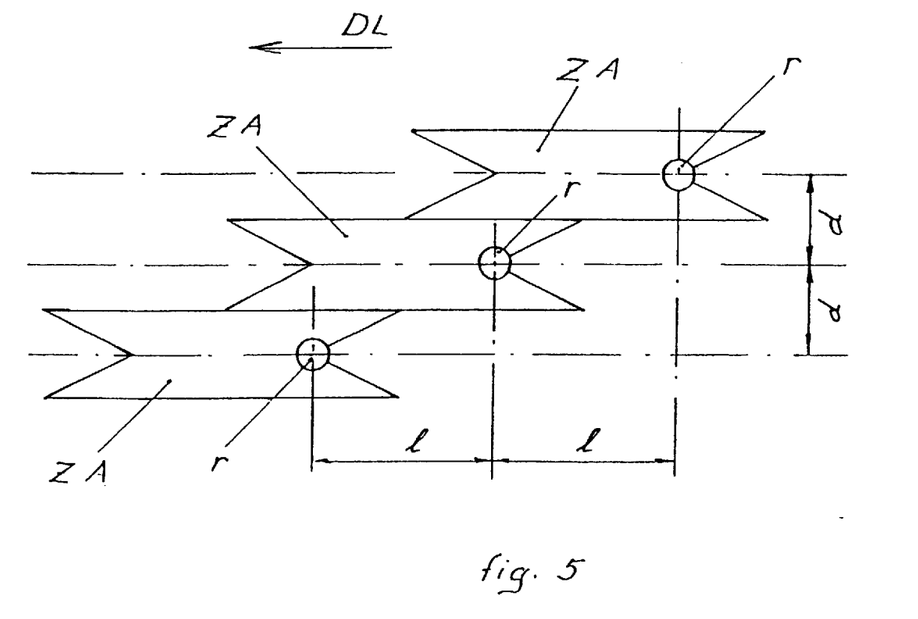
FIG. 5 is a schematic view of the actuating zones of the rivets, resulting from the crossed arrangement of the cables of two superimposed layers.

FIG. 5 shows schematically the actuating zones of the rivets; the shape of this actuating zone ZA, results from the crossed arrangement of the cables to which is applied the share, transmitted by a rivet, of the global pulling stress. The area of these zones is roughly equal to 3/2 of l×d, l being the shifting of the rivets in the longitudinal direction and d their shifting in the transversal direction. Knowing the peeling resistance characteristics of the material of the junction devices over the cables, l can be calculated, while d is a data imposed by the number of rivets and by the width of the junction device, i.e. the dimension of this latter in the transversal direction. The number of rivets is calculated as indicated hereabove in relation with the total stress to be transmitted. Obviously, all these calculations bear safety coefficients and in practice one starts from the problems currently encountered by the users, in order to determine the standard type of junction devices, which meet these problems. Junction devices according to the invention, <<custom>> manufactured, are an exception.

Figure 6:
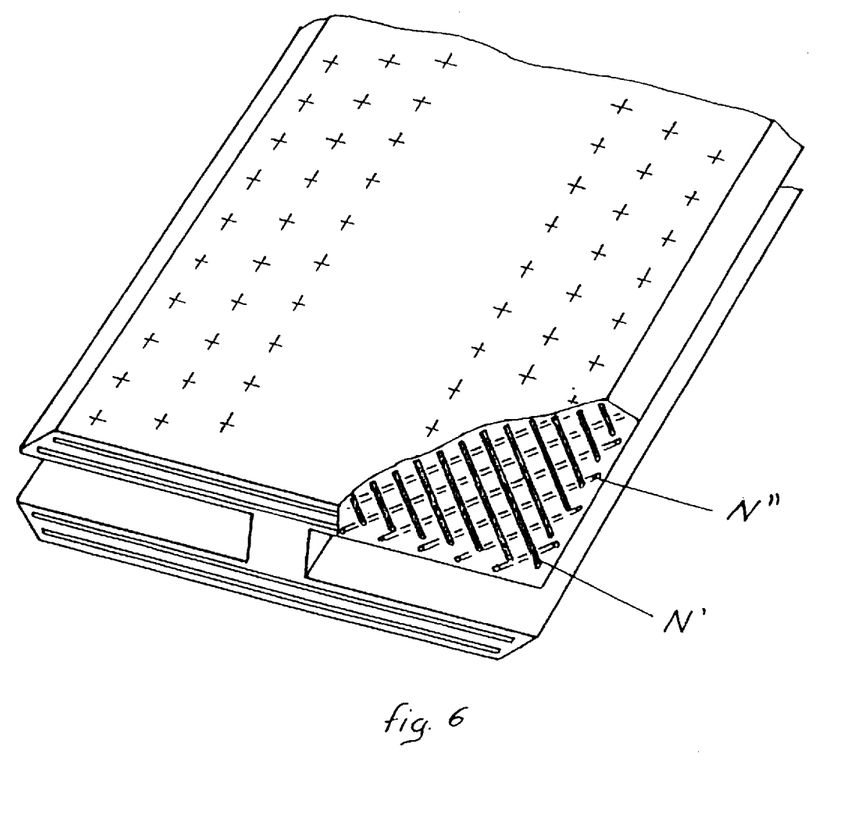
FIG. 6 is a perspective view of a junction device according to the invention, representing in partial sectional view, a reinforcement element with two cable layers.

The section view of FIG. 6, allows the observation of two crossed cable layers N' and N" which form a reinforcement element the cables of the upper layer N', are in thick lines, while those of the lower layer N" are in double lines. The crosses show symbolically the position of the rivets.

In what concerns the manufacture of the junction devices, the most current method of manufacturing is based on moulding with vulcanisation, the constituent material of the junction device and the binding material of the cables being a rubber which can be vulcanised, or on injection moulding if the constituent material is a synthetic material. Conveniently, the reinforcement elements described hereabove must be placed in the moulds, most often arranged in two layers in what concerns the upper reinforcement element and in two layers for the lower reinforcement element. The wedging of this layers inside the moulds is carried out according to techniques, well known in the art. If the junction devices comprise holes provided beforehand for the attachment with rivets, provision must be made for rods allowing these holes in the moulded products. The rods may be solidly linked to each one of the half moulds, crossing the internal space of the half moulds provided for moulding respective wings of the junction device, and on which the layers are threaded during the preparation of the moulds. To this effect, conveniently the rods of each half moulds should have a conical shaped free end, with a rounded tip, in order to fit between two cables of one layer and two cables of the other layer without damaging them. It is also possible to replace the rods by withdrawable pins which cross from outside the internal space of the respective half moulds and which are removed after stripping. The rounded tip of conical shape may be replaced by an ogival shape or by a semispherical shape.

The notion of central part of the generally H-shaped profile, is used for the interpretation of the present description and of the following claims, in a very broad meaning. It includes for instance, alternative solutions in which the central part, used as abutment for the ends of the conveyor band, is made up of elements apart from each other by empty intervals: the junction device may also be built up with two independent pieces which meet through their central part during the setting into operation, thus enabling for instance, in the vulcanisation press, to stack successively a part of the junction device, the ends of the conveyor band, in abutment against the central part of the first part of the junction device, and the second part of the junction device the central part of which, which passes between the ends of the conveyor band and meets the other central part.

It is also possible that the bar of the H-shaped profile, in the case of a junction device in two separate pieces, should be just merely outlined, by kind of stubs which do not meet by which project sufficiently with respect to the plane of the internal faces of the wings of one same pair, in order to be used as abutments by the ends of the conveyor band.

However, in the case where rivets are used which pass through hole prepared before hand, preferably the junction device should be in a single piece, the central part thus insuring a correct alignment of the upper wings holes with those of the lower wings; however if the junction device is made in two pieces, preferably and in this case where rivets are used, the means forming the central part should meet by male and female parts enabling a selfcentering and therefore a mutual wedging of the two parts, enabling a correct alignment of the rivet holes.

The aims of the present invention are thus perfectly reached, while allowing numerous alternative solutions for the embodiment of finished products in relation with the requirements of the industrial users, these alternative solutions still remaining within the scope of the claims.

What is claimed is:

1. A junction device for a conveyor band, said device being generally H-shaped, made up with a central part (1) or core, and with two pairs of wings (2, 2'; 3, 3') approximately parallel, forming one single piece with the central part to which they are connected on each side of the central part, each of the pairs of wings adapted to be fixed to each end (E) of the conveyor band respectively inserted in a space between the wings of the two pairs of wings and approximately in abutment against the central part (1), two reinforcement elements (4, 4') being embedded in the flexible and elastic constituent material of the junction device, a first of said two reinforcement layers extending in the upper wing (2) of one pair of wings (2, 2') and in the upper wing (3) of the other pair of wings (3, 3'), a second reinforcement element (4') extending in the lower wing (2') of one pair of wings (2, 2') and in the lower wing (3') of the other pair of wings (3, 3'), the constituent material of the junction device adhering to the reinforcement elements (4, 4') wherein each of said reinforcement elements (4, 4') is made up of at least two layers (N' N", . . . ) of cables (6 or 7) having a high resistance to tensile stress and being inherently unextensible or slightly extensible, wherein said reinforcement elements are arranged in parallel planes, with a space provided between the layers, the cables (6 or 7) of each of the two layers (N', N", . . . ) being parallel to each other while the cables of a first of said two layers is perpendicular to the cables of a second of said two layers in a plan view, and cables of each of said two layers forming an acute angle α with the longitudinal direction.

2. Junction device according to claim 1, characterised by the fact that the angle α is close to 45°.

3. Junction device according to claim 1, wherein the constituent matter of the junction device is a vulcanisable rubber, vulcanised at the finished state of the junction device.

4. Junction device according to claim 3, wherein a binding material joins and adheres to the cables of each of said two layers.

5. Junction device according to claim 4, wherein the binding material joining the cables of each of said two layers is a vulcanisable rubber, vulcanised at the finished state of the function device.

6. Junction device according to claim 1, wherein the constituent material of the junction device is a flexible and elastic synthetic material, suitable or made suitable for adhering to the cables.

7. Junction device according to claim 6, wherein a binding material joining and adhering to the cables of each of said two layers is a synthetic material, suitable or made suitable for adhering to the constituent material of the junction device.

8. Junction device according to claim 1, wherein holes for rivets are provided in the wings of one of said two pair of wings, in such a way that a longitudinal zone including a rivet does not meet other rivets.

9. Junction device according to claim 8, wherein a number of holes for rivets is calculated by dividing a global expected pulling stress to be transmitted, by a combing resistance of a rivet in a frame of the conveyor band.

10. Junction device according to claim 9, characterised by the fact that each hole for rivets is shifted with respect to the adjoining hole or holes for rivets by a distance l in the longitudinal direction, the distance l being calculated in such a way as the area of the actuating zone of each rivet is sufficient in order that the peeling resistance of the constituent material and/or of the binding material should be at least equal, bearing a safety coefficient, to the share of the expected global pulling stress assigned to each rivet.

11. Method for manufacturing a junction device according to claim 1, wherein the cable layers of an upper reinforcement element is set into position and wedged in a vulcanisation or injection of a first half mould, and the cable layers of a lower reinforcement element is set out in a second half of said moulds.

12. Method for manufacturing junction devices according to claim 11, in which layers of the reinforcement elements are threaded on rods arranged perpendicularly to the said layers, solidly linked to said first and second half mould, ends of said rods have a conical shape, a cone tip being rounded or with a semispherical or ogival shape, which crosses an internal space of the first and second half mould provided for moulding the respective wings of the junction device.

13. Method for manufacturing junction devices according to claim 11, in which the reinforcement element layers are threaded on withdrawable or retractable pins, the ends of which have a conical shape, a cone tip being rounded or with a semispherical or ogival shape, the said pins crossing the internal space of the first and second half mould, provided for moulding respective wings of the junction device.

* * * * *